US005160791A

United States Patent [19]

Tannenbaum

[11] Patent Number: 5,160,791

[45] Date of Patent: Nov. 3, 1992

[54] NON-STICK COATING SYSTEM WITH TWO PERFLUOROCARBON RESINS IN TOPCOAT FOR CONCENTRATION GRADIENT

[75] Inventor: Harvey P. Tannenbaum, Philadelphia, Pa.

[73] Assignee: E. I. Du Pont de Nemours and Company, Wilmington, Del.

[21] Appl. No.: 626,500

[22] Filed: Dec. 12, 1990

[51] Int. Cl.[5] .................... B32B 15/08; B32B 27/32

[52] U.S. Cl. .................... 428/422; 427/372.2; 427/385.5; 428/463

[58] Field of Search .................... 428/421, 422, 463; 524/514, 441, 546, 525; 523/346; 427/257, 385.5, 372.2

[56] References Cited

U.S. PATENT DOCUMENTS

| | | | |
|---|---|---|---|
| 3,857,852 | 12/1974 | Tieszen | 523/346 |
| 3,928,675 | 12/1975 | Tieszen | 428/257 |
| 4,049,863 | 9/1977 | Vassiliou | 428/422 |
| 4,087,394 | 5/1978 | Concannon | 524/514 |
| 4,118,537 | 10/1978 | Vary et al. | 428/421 X |
| 4,123,401 | 10/1978 | Berghmans et al. | 428/463 |
| 4,167,605 | 9/1979 | Attwood et al. | 428/419 |
| 4,252,859 | 2/1981 | Concannon et al. | 428/422 |
| 4,287,112 | 9/1981 | Berghmans | 524/441 |
| 4,425,448 | 1/1984 | Concannon et al. | 524/546 X |
| 4,548,986 | 10/1985 | Suzuki et al. | 525/66 |

FOREIGN PATENT DOCUMENTS

| | | | |
|---|---|---|---|
| 887122 | 11/1971 | Canada . | |
| 0056280 | 7/1982 | European Pat. Off. . | |
| 0100889 | 2/1984 | European Pat. Off. . | |
| 0389966 | 10/1990 | European Pat. Off. . | |
| 1018269 | 1/1966 | United Kingdom | 524/525 |
| 1230339 | 4/1971 | United Kingdom . | |
| 1454225 | 11/1976 | United Kingdom . | |

*Primary Examiner*—Thomas J. Herbert, Jr.
*Attorney, Agent, or Firm*—Richard H. Burgess

[57] ABSTRACT

Improved non-stick coating systems can be applied on a primer with a topcoat containing two types of perfluorocarbon resin, one with a melt viscosity above about $10^{10}$ poises, the other with a melt viscosity in the range of $10^3$ to $10^8$ poises.

7 Claims, No Drawings

NON-STICK COATING SYSTEM WITH TWO PERFLUOROCARBON RESINS IN TOPCOAT FOR CONCENTRATION GRADIENT

BACKGROUND OF THE INVENTION

This invention relates to coatings systems, such as for cookware, which minimize sticking. More particularly, it relates to multilayer coating systems which provide concentration gradients within the coating.

U.S. Pat. No. 4,087,394 — Concannon (1987) discloses aqueous concentration gradient coatings of fluoropolymer which is 20–80% of a homopolymer of polytetrafluoroethylene (PTFE) or a copolymer of fluorinated ethylene-propylene (FEP) made of 5-100% tetrafluoroethylene (TFE) with 95–0% hexafluoropropylene (HFP), with 80–20% of a film forming polymer which can be polyamide-imide (PAI). The coating is applied by spraying onto aluminum sheet, or a variety of substrates. Other application techniques are mentioned. Nothing is said about substrate preparation. Although PTFE and FEP are treated as a continuum, there are no suggestions to use a blend such as 50% PTFE, 50% FEP.

Representative of nonaqueous perfluoropolymer concentration gradient patents are U.S. Pat. No. 3,661,831 (1972) and 4,143,204 (1979) on FEP (preferably FEP has 3–20% HFP, balance TFE) with various film formers including PAI. At the end of each specification, example 24 teaches using such a coating as a primer under an ordinary PTFE topcoat on a frypan. U.K. No. 1,230,339 (1971) claims articles coated with nonaqueous PTFE-PAI with a concentration gradient. This and equivalent Canadian No. 887,122 — Fang (1971) provide a single coating of PAI and PTFE on a metal substrate with a concentration gradient from mostly PAI at the substrate to mostly PTFE at the air interface. This is applied as a single coat without any special primer on ordinary steel or sand-blasted aluminum.

A mixture of FEP and PTFE in an organic dispersion is in U.S. Pat. No. 3,904,575 (1975) - Satokawa. This says that lower molecular weight PTFE permits more FEP to be included in a stable dispersion. The use of PAI and other film formers is also disclosed. The examples teach sand blasting an aluminum substrate before applying the coating.

Also, U.K. No. 1,454,255 — Berghmans and Seymus (1976) discloses aqueous dispersion coatings of mixtures of PTFE and FEP with $SiO_2$ and aluminum phosphate applied preferably to grit-blasted or frit-coated aluminum, but also specifically to untreated aluminum.

U.S. Pat. No. 4,287,112 — Berghmans (1981) discloses PPS with PTFE, FEP and/or a copolymer of tetrafluoroethylene and hydrocarbon ether monomer which have been completely substituted with fluorine atoms as described in U.S. Pat. No. 4,292,859 (1981) and 4,351,883 (1982) — both Concannon, known as PFA, along with Al flake and $TiO_2$ pigment, in both aqueous and non-aqueous coatings. The preferred PTFE is irradiated micropowder. PTFE micropowder may be made according to the teachings of U.S. Pat. No. 3,116,226 — Bowers (1963), U.S. Pat. No. 4,029,890 — Brown et al (1977) or U.S. Pat. No. 4,200,551 — Derbyshire (1980).

Coatings systems including intermediate and top coats are described in various patents including:

U.S. Pat. No. 4,049,863 — Vassiliou (1977);

U.S. Pat. No. 4,118,537 — Vary and Vassiliou (1978);

U.S. Pat. No. 4,123,401 — Berghmans and Vary (1978);

U.S. Pat. No. 4,252,859 — Concannon and Vary (1981);

U.S. Pat. No. 4,351,882 — Concannon (1982).

SUMMARY OF THE INVENTION

The present invention, in certain of its embodiments, provides a coating system comprising a primer, a topcoat, and up to one or more intermediate coats between the primer and the topcoat, wherein the primer and any intermediate coats comprise perfluorocarbon resin, and the topcoat is applied to the substrate, after application of the primer and any intermediate coats, in the form of an aqueous dispersion comprising perfluorocarbon resin comprising 50–90% by weight of a first polytetrafluoroethylene resin having a melt viscosity of at least about $10^{10}$ poises, plus 50–10% of a second perfluorocarbon resin selected from the group consisting of polytetrafluoroethylene and a perfluorinated copolymer of hexafluoropropylene and tetrafluoroethylene having a melt viscosity in the range of $10^3$ to $10^8$ poises.

DETAILED DESCRIPTION

Addition of perfluorocarbon polymer having a melt viscosity (MV) in the range of $10^3$–$10^8$ poise, to a topcoat composition composed of PTFE ($MV=10^{11}$) imparts a synergistic effect in which the lower MV fluoropolymer stratifies away from the interface with the primer or intermediate, forming a concentration gradient in the topcoat. The lower MV flurorpolymer relatively concentrated at the top surface can flow better and provide a slicker surface for release. Also, the higher MV fluoropolymer deeper in the coating provides greater durability as the particles protrude into the surface. The required cure temperature to achieve this stratification can be modified by the choice of fluoropolymer.

Coating systems of the invention give improved food release and slickness and good resistance to usual durability tests.

In the following examples, the polyamide imide, colloidal silica and dispersions preferably are those of U.S. Pat. No. 4,049,863 — Vassiliou (1977); the ultramarine blue is that of U.S. Pat. No. 4,425,448 — Concannon and Rummel (1984); the polyether sulfone is that of U.S. Pat. Nos. 3,981,945 (1976), 4,090,993 (1978) — both Atwood et al, and U.S. Pat. No. 4,131,711 (1978) — Atwood, and the polyarylene sulfide is the polyphenylene sulfide of U.S. Pat. No. 4,287,112 (1981) — Berghmans.

The following examples and test data provide improved intercoat adhesion when used as a topcoat on fluoropolymer-containing primers or intermediate coats. The fluoropolymers are provided as 60% dispersions in water. The compositions were blended by techniques normal in the art and them applied to a smooth, degreased aluminum substrate by spraying. Proportions are given in weight percent except where indicated otherwise.

EXAMPLE 1

FEP/PTFE - Primer

TABLE 1

| Weight Percent | Composition: 40% FEP/60% PTFE Primer |
|---|---|
| 0.007 | Zinc oxide |
| 0.050 | "Afflair 153" titania coated mica from EM Industries |
| 6.497 | Ultramarine Blue pigment |
| 6.750 | "T-30" PTFE from Du Pont |
| 0.972 | "Ludox AM" colloidal silica from Du Pont |
| 4.153 | "TE 9075" FEP from Du Pont |
| 4.641 | AI-10 polyamide imide resin from Amoco |
| 67.628 | Deionized water |
| 0.630 | "Triton X-100" octyl phenol polyether alcohol non-ionic surfactant from Rohm and Haas |
| 0.655 | Diethylethanolamine |
| 1.309 | Triethylamine |
| 3.614 | Furfuryl alcohol |
| 100.00 | TOTAL |

This primer is used in Examples 4 and 5.

EXAMPLE 2

Polymerization and Concentration of lower MV PTFE

A cylindrical, horizontally disposed, water jacketed, stirred, stainless steel reactor having a length to diameter ratio of about 1:5, a 4-bladed cage-type agitator running the length of the reactor, and a water capacity of about 80 parts was charged with 46 parts of demineralized water and 0.022 parts of ammonium perfluorocaprylate dispersing agent. The reactor was pressure tested at 2.8 MPa and 90° C. while stirring the reactor contents at 46 rpm. The reactor was then cooled to reduce the temperature of its contents below 30° C. The reactor was then evacuated and purged three times with tetrafluoroethylene (TFE) monomer, leaving a reduced pressure on the reactor after the final evacuation. A valve was then opened to slowly release ethane into the reactor until the pressure was raised by 0.06 MPa. The valve was then closed and the reactor temperature was raised to 90° C. with the agitator running at 46 rpm. After the temperature reached 90° C., the reactor was pressurized with TFE to a pressure of 2.6 MPa. A freshly prepared solution of 1.1 parts of a solution of (0.1%) ammonium persulfate (APS) and (1.5%) disuccinic acid peroxide (DSP) in demineralized water was pumped into the reactor at a rate of 0.11 parts/minute to initiate polymerization. After polymerization began (0.07 MPa drop in reactor pressure), additional TFE was added to the reactor at a rate so as to maintain the pressure at 2.6 MPa. After 3 parts of TFE had been added to the reactor after kickoff, 2.2 parts of a 2.4% solution of ammonium perfluorocaprylate in demineralized water was pumped into the reactor at a rate of 0.2 parts/minute. After 15 parts TFE addition, 0.66 parts of a solution of APS (0.05%), DSP (0.5%), and methanol (0.5%) in demineralized water were pumped into the reactor at a rate of 0.11 parts/minute. When 22 parts of TFE had been added to the reactor, the TFE feed was stopped but the reaction was continued until the reactor pressure dropped to 1.3 MPa. The reactor was then vented and the product dispersion was removed. The dispersion contained about 34% polymer by weight. A small amount of the dispersion was coagulated by the application of vigorous stirring and the resulting powder was then dried in a 120° C. oven.

The melt viscosity of the dried resin was measured at 372° C. by the procedure described in ASTM D-1238-52T modified by (1) using a cylinder, orifice, and piston tip made of a corrosion-resistant alloy, Hayes Stellite 19, (2) charging a 5.0 g sample to the 9.53 mm ID cylinder, and (3) five minutes after charging, the sample is extruded through a 2.10 mm diameter, 8.00 mm long square-edged orifice under a load of 5000 g. The melt viscosity in poise was calculated as 36,910 divided by the observed extrusion rate expressed in grams per minute. The melt viscosity of this dried powder was $5.6\times10^4$ poise.

The remaining as-polymerized dispersion was heated to 80° C. while gently stirring. When the temperature reached 40°–45° C., a weight of Triton X-100 non-ionic surfactant of octyl phenol polyether alcohol sold by Rohm and Haas Co. equivalent to 8% of the weight of polymer was added to the dispersion. Citric Acid (0.02% based on polymer) and then 19% aqueous ammonium carbonate solution (0.7% based on polymer) were then added. When the temperature reached 80° C., the agitation and heat were stopped. Upon cooling, the dispersion separated into two layers with nearly all of the polymer being concentrated in the lower layer. This lower layer was removed and analyzed for % solids and % Triton. The respective levels were found to be 53.6% solids and 3.7% Triton. Adjustments were made with water and Triton X-100 additions so that the final levels were 46.7% and 8.9% respectively.

EXAMPLE 3

Polymerization and Concentration of Higher MV PTFE

A batch was polymerized in a similar manner to that described in Example 2 except for the following; (1) the precharge included 1.3 lbs. of paraffin wax, and (2) chloroform (0.026 parts) was added to the reactor in place of ethane. All other respects of the polymerization were identical to that described in Example 1. The product dispersion contained 34% (by weight) polymer.

A small amount of the dispersion was coagulated and dried. The melt viscosity of the dried powder was measured as above except that the 5000 g weight was replaced by a 15,000 g weight. The melt viscosity was then calculated by dividing 110,250 by the observed melt flow in grams per minute. The value obtained was $7.3\times10^6$ poise.

The remaining dispersion was concentrated in an identical manner to that described above except that the ammonium carbonate solution was replaced by an equivalent amount of 28% ammonium carbonate solution. The final solids level was 60.2% and the Triton X-100 level was 5.9%.

Low MV PTFE for the invention can be provided in the form of as-polymerized micropowder made in accordance with this Example 2 or in the form of irradiated and comminuted micropowder made by techniques such as taught by the above-identified Brown et al and Derbyshire patents.

EXAMPLE 4

Topcoat

TABLE 2

| INGREDIENT | TOPCOAT 1 | TOPCOAT 2 |
|---|---|---|
| "T-30" PTFE from Du Pont | 280.74 | 196.52 |

TABLE 2-continued

| INGREDIENT | | TOPCOAT 1 | TOPCOAT 2 |
|---|---|---|---|
| PTFE MV = $5.6 \times 10^4$ poises from Example 2 | | 16.85 | 101.07 |
| "Afflair 153" titanim-coated mica from EM Industries | | 0.42 | 0.42 |
| Butyl Carbitol | 9.67 | | |
| Hydrocarbon Solvent | 11.95 | | |
| Cerium Octoate | 2.25 | | |
| Triethanol Amine | 18.52 | | |
| Oleic Acid | 4.95 | | |
| Triton X-100 | 2.45 | 50.01 | 50.01 |
| Acrylic Latex of 39 parts by weight terpolymer of methyl methacrylate/57 parts ethyl acrylate/4 parts methacrylic acid, dispersion at 40% solids in water, 0.2 μm average particle size | | 52.12 | 52.12 |
| Carbon black mill base | | 5.99 | 5.99 |
| Ultramarine blue mill base | | 1.34 | 1.34 |

Application

This system is comprised of a primer of PTFE, FEP and polyamide imide of Example 1 which is applied at 5-10 μm dry film thickness (DFT) to a metal surface which has been washed to remove oil and dirt contamination, air dried, and topcoated with a single (15-17.5 μm DFT) or multiple topcoats of this example in thicknesses 12.5-17.5 μm DFT each and having compositions similar to those shown in Table 2. The films are baked 10 minutes at 150° C. followed by a high temperature bake for a minimum of 3 minutes over 415° C.

EXAMPLE 5

Testing

Smooth aluminum bakeware with cupcake-shaped depressions were coated with primer of Example 1 and topcoat of Example 4. A variety of types of baked goods were baked, then the bakeware was turned upside down. If the baked goods fell out easily, leaving no residue, the coating was rated best. Increasing amounts of residue sticking to the coating, and the need to hit the back of the bakeware or even to dig the baked goods out with a tool, gave progressively lower ratings. Trials were made on bakeware with and without cooking grease applied between bakes.

The results without grease were equivalent to commercial coatings, and with grease were superior to commercial coatings.

For use with the topcoats of the invention, primers can be applied direct to smooth, degreased substrates, or the substrates can be grit-blasted or etched to provide a greater profile, or frits can be applied first to the substrates.

I claim:

1. A coated substrate comprising a substrate with a multi-layer non-stick coating, comprising a primer, a topcoat, and up to one or more intermediate coats between the primer and the topcoat, wherein:

the primer and any intermediate coats comprise perfluorocarbon resin, the topcoat is applied to the substrate after application of the primer and any intermediate coats, in the form of an aqueous dispersion comprising perfluorocarbon resin comprising 50-90% by weight of a first polytetrafluoroethylene resin having a melt viscosity of at least about $10^{10}$ poises, plus 50-10% of a second perfluorocarbon resin selected from polytetrafluoroethylene and a perfluorinated copolymer of hexafluoropropylene and tetrafluoroethylene having a melt viscosity in the range of $10^3$ to $10^8$ poises.

2. The coating composition of claim 1 wherein the melt viscosity of said first resin is at least $10^{11}$ poises and of said second resin is in the range of $10^4$-$10^6$ poises.

3. The coated substrate of claim 1 wherein the topcoat has 60-85% of said first resin, the balance said second resin.

4. The coated substrate of claim 1 wherein the coating comprises at least one intermediate coat.

5. The coated substrate of claim 1 wherein the substrate is metal selected from aluminum, stainless steel and carbon steel.

6. The coated substrate of claim 1 wherein the top coat resulting from said aqueous dispersion is not uniform in composition throughout its thickness but has a lower concentration of said first polytetrafluoroethylene resin at the interface with the substrate than at the opposite interface.

7. A process of making the coating substrate of claim 1 wherein the coatings are applied to the substrate without completely drying one coating before applying the next, and then the entire coating is cured by heating at at least 350° C.

* * * * *